US009367318B1

(12) United States Patent
Laudon (10) Patent No.: US 9,367,318 B1
(45) Date of Patent: *Jun. 14, 2016

(54) DOUBLING THREAD RESOURCES IN A PROCESSOR (71) Applicant: Google Inc., Mountain View, CA (US)

(72) Inventor: James Laudon, Madison, WI (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/930,893

(22) Filed: Nov. 3, 2015

Related U.S. Application Data (63) Continuation of application No. 13/839,602, filed on Mar. 15, 2013, now Pat. No. 9,207,944.

(51) Int. Cl.
G06F 9/38 (2006.01)
G06F 9/30 (2006.01)

(52) U.S. Cl.
CPC .......... *G06F 9/3802* (2013.01); *G06F 9/30145* (2013.01); *G06F 9/38* (2013.01)

(58) Field of Classification Search
CPC ... G06F 9/3802; G06F 9/3885; G06F 9/3853; G06F 9/382; G06F 9/3836; G06F 9/30145; G06F 9/38
See application file for complete search history.

(56) References Cited

U.S. PATENT DOCUMENTS

| 6,988,181 | B2* | 1/2006 | Saulsbury ........... G06F 9/30101 712/22 |
| 7,096,343 | B1 | 8/2006 | Berenbaum et al. |
| 7,849,291 | B2 | 12/2010 | Hansen et al. |
| 2004/0054880 | A1 | 3/2004 | Bernstein et al. |
| 2004/0216113 | A1 | 10/2004 | Armstrong et al. |
| 2006/0179279 | A1 | 8/2006 | Jones et al. |
| 2007/0101013 | A1 | 5/2007 | Howson |
| 2012/0110271 | A1 | 5/2012 | Boersma et al. |
| 2012/0124338 | A1 | 5/2012 | Webber |

* cited by examiner

Primary Examiner — Farley Abad
(74) Attorney, Agent, or Firm — Fish & Richardson P.C.

(57) ABSTRACT

Methods and systems are provided for managing thread execution in a processor. Multiple instructions are fetched from fetch queues. The instructions satisfy the condition that they involve fewer bits than the integer processing pathway that is used to execute them. The instructions are decoded, and divided into groups. The instructions are processed simultaneously through the pathway, such that part of the pathway is used to execute one group of instructions and another part of the pathway is used to execute another group of instructions. These parts are isolated from one another so the execution of the instructions can share the pathway and execute simultaneously and independently.

18 Claims, 5 Drawing Sheets

START:

1) R1 ← R2 + R1

2) R2 ← R0 + R2

3) ST R3 → [R2]

4) R2 ← R3 + R0

5) R3 ← R1 + R2

6) LD R0 ← [R2 + R0]

7) BNEZ R3, START

DOUBLING THREAD RESOURCES IN A PROCESSOR

CROSS-REFERENCE TO RELATED APPLICATION

This Application is a continuation of U.S. application Ser. No. 13/839,602, titled "DOUBLING THREAD RESOURCES IN A PROCESSOR" filed Mar. 15, 2013, the disclosure of which is incorporated herein by reference in its entirety.

BACKGROUND

This specification describes a process for improving performance in a multithreaded processor.

Processors are usually designed to handle operands of a certain size. For example, operands may be 32 bits or 64 bits in size. In general, processors are designed to perform integer operations such that even if operands are smaller than the maximum size handled by the processor, operands are padded with additional 0's or sign-extended and some processor capacity is left unutilized. For example, in a 64 bit processor, integer operations are designed to expect integer operands that are 64 bits in size. Even with legacy software that is designed to use operands that are 32 bits in size, integer operations will operate on 32 bits at a time and simply ignore the other 32 bits.

While this approach allows a processor to treat all operands the same, regardless of size, parts of the integer processing pipeline and the load/store pipeline are left unused when processing operands that are narrower than the full bit width of the processing pipeline.

SUMMARY

The systems and methods described in this application improve performance in a multithreaded processor by processing multiple integer instructions at once in an integer pathway, where the instructions are of a bit size that is smaller than the bit size of the processor as a whole, and the integer pathway is split to allow execution of multiple instructions independently and simultaneously.

In general, one innovative aspect of the subject matter described in this specification can be implemented in various methods. For example, a method may include fetching a first multiple of instructions using multiple fetch queues, each instruction handling a first number of bits, from an instruction cache in a processor designed to handle a second multiple of threads of a second number of bits in size, where the first multiple is greater than the second multiple and the second number of bits is greater than the first number of bits; decoding the first multiple of instructions received from the fetch queues; dividing the first multiple of instructions received from the fetch queues into a second multiple of groups of instructions by issuing instructions to dispatch queues, each of the groups of instructions being instructions handling the first number of bits; processing each group of instructions through a respective integer processing pathway provided by the processor that processes operands of the second number of bits in size, wherein for each pathway the respective first number of bits are used to process instructions from the respective group in the pathway, and wherein each group of instructions are mapped to its respective integer pathway such that each pathway operates simultaneously and process information independently in separate threads; and outputting the results of the processing of each group of instructions.

Other implementations of these aspects include corresponding systems, apparatus, and computer programs, configured to perform the actions of the methods, encoded on computer storage devices.

These and other implementations may each optionally include one or more of the following features. For example, a method may further include dividing the first multiple of instructions received from the fetch queues comprises dividing the first multiple of instructions received from the fetch queues into a first group of instructions handling a first number of bits and a second group of instructions handling a first number of bits; processing each group of instructions comprises processing the first group of instructions and the second group of instructions through an integer processing pathway provided by the processor that processes operands of the second number of bits in size, wherein a first set of bits in the operand are used to process instructions from the first group in a first pathway and a second set of bits in the operand are used to process instructions from the second group in a second pathway, and wherein the first and second group of instructions are mapped to a first pathway and second pathway such that the first and second pathway operate simultaneously and process information independently; and outputting the results of the processing comprises outputting the results of the processing of the first and second groups of instructions.

In an implementation, the first multiple of instructions may be fetched from an instruction cache. An implementation may include fetching a third multiple of instructions using multiple fetch queues, each instruction handling the first number of bits, from an instruction cache in the processor; decoding the third multiple of instructions received from the fetch queue; processing the third multiple of instructions as simultaneous threads of the first number of bits by using a third multiple of parallel floating-point processing pathways; and outputting the results of processing the third multiple of instructions when the results of the first and second groups are output.

An implementation may include using a reorder buffer or checkpointing unit to manage the processing of the threads to ensure that the results of the processing are committed in program order.

An implementation may include processing the first group of instructions and the second group of instructions using at least one of shared store queues or shared load queues. In such an implementation, shared store queues and load queues may use divided or replicated or extended data queues and divided or replicated or extended address queues.

In an implementation, the first multiple may be twice the value of the second multiple. For example, the first multiple may be 4 and the second multiple, may be 2. In an implementation, the first number of bits may be 32 and the second number of bits may be 64. In an implementation the first number of bits may be a power of 2 that is at least 8, and the second number of bits may be twice the first number of bits.

In an implementation, the instructions in the first pathway are processed as the uppermost bits of the operand for the integer processing pathway and the instructions in the second pathway are processed as the lowermost bits of the operand.

In an implementation, the processing uses a divided integer register file. In such an implementation, the integer register file may use static mapping or dynamic mapping.

The implementations described below are examples of specific ways of implementing the technology described by this application. For example, some implementations present the technology in an implementation where a processor that is designed to process a single thread may be expanded to process a plurality of threads. However, the technology that is the subject of this application may include other related implementations as well.

Implementations are advantageous because they allow utilization of resources that would otherwise be unutilized. Implementations can subdivide the physical registers so that each thread has its own respective unshared portion of the register. This subdivided sharing of registers provides a set of physical registers that is effectively larger than sharing whole registers, and allows more instructions to be handled during a time period by similar physical hardware. Thus, the implementations may increase program performance by allowing faster execution and allowing execution of programs for which there might otherwise be insufficient resources for execution.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Processor architectures that are designed to accommodate operands of a base size often handle operands that are smaller than the base size of operands handled by the processor. For example, 64-bit processor architectures usually include support for programs that were written for 32-bit architectures (and sometimes for 16-bit and 8-bit architectures.) These programs were written with the assumption that the operands handled by the processor are to be of these smaller sizes. This support is typically used for legacy code developed before the 64-bit architecture existed.

With current approaches, processor designers put all their optimization efforts into the 64-bit design, and handle the 32-bit design by only using the lower half of registers, ALUs, load and store buffers, etc. For example, such processors can operate by treating 32-bit operands as 64-bit operands that are padded with extra 0's or may be sign-extended. In some implementations, operands may be sign-extended because this facilitates condition-code generation, but the example implementations presented in this application are based on the approach in which operands are padded with 0's.

In addition, many of the features available in 64-bit mode are not available in 32-bit mode, as such features were added to the architecture later and are usually added only to the 64-bit mode. Typically, many of these 64-bit-only features are added with the introduction of the 64-bit architecture. However, for a significant fraction of today's workloads, 64-bit architectures are not necessary as the address space for the workload can fit within 32-bit addressing and the most common integer data type still in use by high-level languages is 32 bits, not 64 bits. Even for architectures where the 32-bit mode does not have the full capabilities of the 64-bit mode, there are performance advantages from better cache usage that can sometimes offset the disadvantage of the lesser capabilities of the 32-bit mode. In an architecture where the 32-bit mode is capable of running all the instructions and accessing all the registers and other processor state available in 64-bit mode, 32-bit mode will nearly always exhibit better cache usage and thus have better performance.

This subject matter of this application further increases the performance benefits available in 32-bit mode by allowing twice as many threads to be executing in the core in 32-bit mode as in 64-bit mode for a modest additional hardware cost. Stated another way, the subject matter process integer instructions with operands that are smaller than the bit width of the processor, and subdivide the integer processing pathway and add additional components to the pathway so that multiple processing pathways, such as an upper and lower pathway, can be provided from a single integer processing pathway.

The subject matter can be further generalized to a first multiple (n) of instructions of a first bit size (b) using n fetch queues for a processor designed to handle a second multiple (m) of threads of a second bit size B, where the first multiple n is greater than the second multiple m and the second bit size B is greater than the first bit size b.

Particular implementations of the subject matter may include methods and system that manage thread execution in a processor by splitting an integer processing pipeline to allow multiple threads of a given bit size that is smaller than the bit size of the pipeline. The implementations combine splitting certain parts of the pipeline, such as the integer register files, the arithmetic logic units (ALUs), store and load queues, and re-order buffers (ROBs). Other parts of the pipeline are replicated, such as the fetch queues. By providing such an architecture, multiple threads can share a pipeline that otherwise would only provide the resources to execute a single thread.

Figure 1:
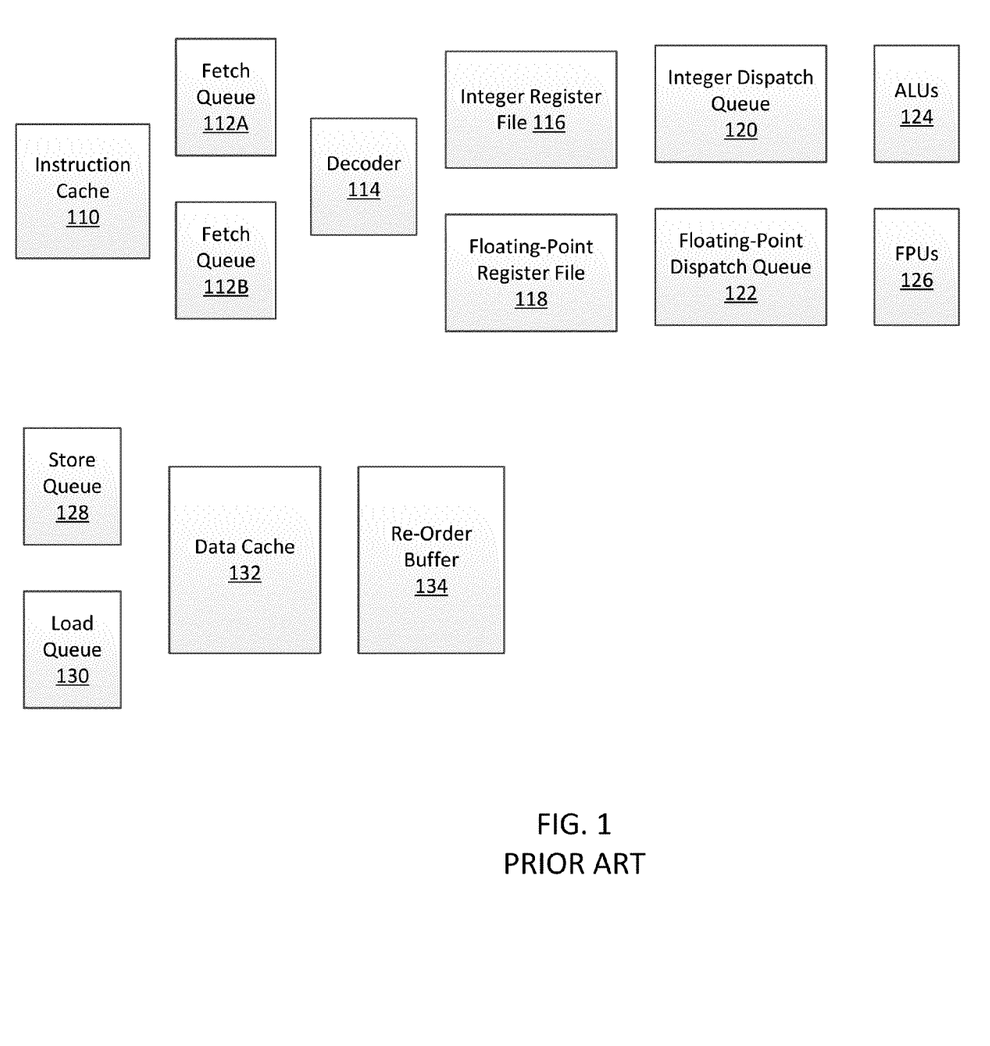
FIG. 1 is a block diagram of a conventional 2-threaded processor core, using existing approaches.

FIG. 1 is a block diagram of a conventional two-threaded processor core. Instructions are fetched from the instruction cache 110 into Fetch Queues 112A and 112B. Each fetch queue 112A and 112B serves one respective thread. The instructions are decoded in decoder 114. For integer operations, the Integer Register File (IRF) 116 supplies the operands to the Integer dispatch queue 120. Likewise, for floating-point operations, the floating-point Register File (FRF) 118 supplies operations to the floating-point dispatch queue 122. Instructions are dispatched from these queues 120 and 122 to the integer arithmetic logic unit ALUs 124 or floating-point units (FPUs) 126, respectively.

Load and store address generation is done in the integer ALUs or dedicated load/store address generators and the loads and stores are placed in the store queue 128 and load queue 130 which will access the data cache 132. In some implementations, a reorder buffer (ROB) 134 commits the results to the integer and floating-point register files in program order. However, other implementations may use a checkpoint-based architecture.

This conventional architecture provides a way to process two threads in parallel by dynamically distributing the integer ALUs, floating-point units, and load/store units between the threads. However, if the integers are smaller than the operand size, they will be padded with additional zero's, such as 32-bit integers in a 64-bit processor, or 64-bit integers in a 128-bit processor.

Figure 2:
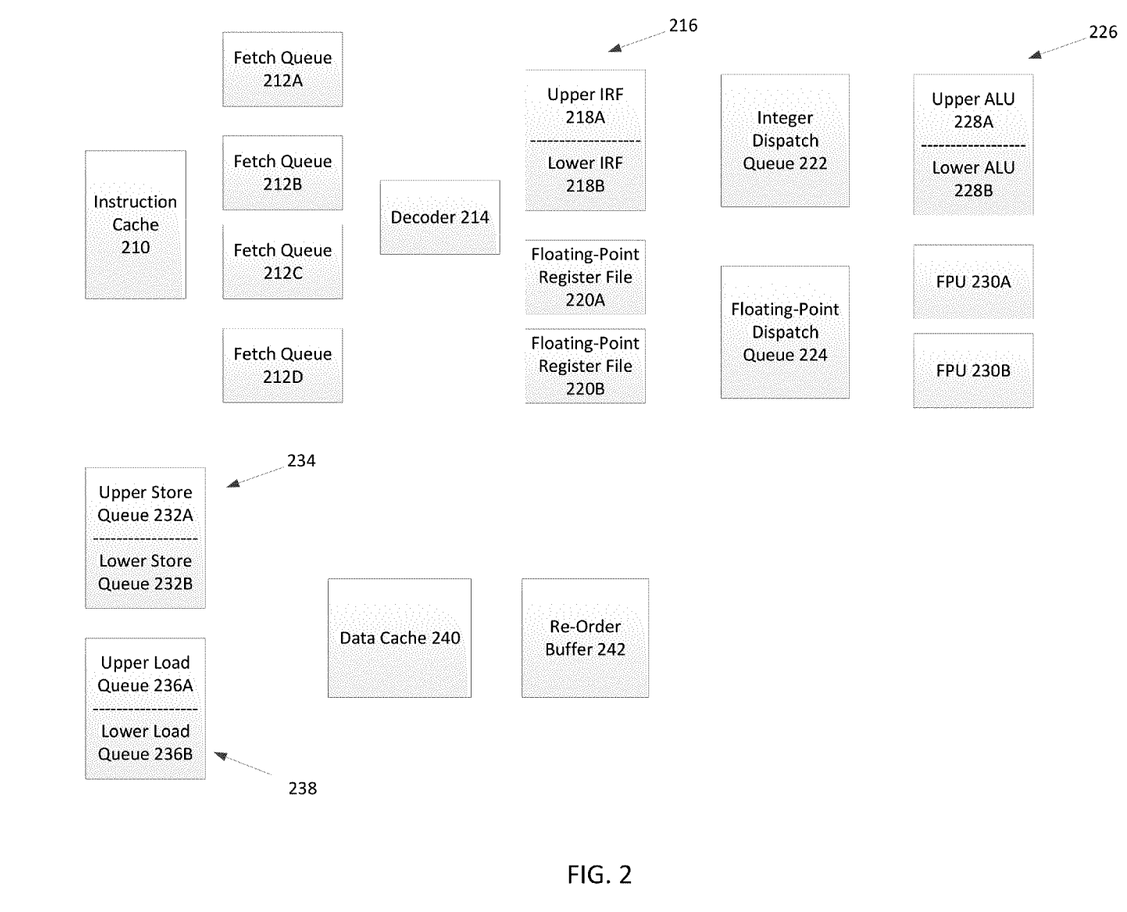
FIG. 2 is a block diagram of an n-threaded processor core, in an implementation.

Implementations of the subject matter of this application utilizes, in an additional thread, the additional architecture that is otherwise utilized for padding in FIG. 1. One such implementation is shown in FIG. 2, which is a block diagram of a 4-threaded processor core. FIG. 2 shows a modified version of the pipeline from FIG. 1 that allow for four 32-bit threads. FIG. 2 is described in the context of a 64-bit processor, but the features of FIG. 2 can be generalized to any B-bit size processor.

At a high level, the pipeline fetches instructions from multiple threads using a plurality of fetch queues, with a typical implementation having one fetch queue per thread. In a typical implementation, the total number of fetch queues would be sized for the number of 32-bit threads, and fewer fetch queues than the total would be used when executing with the one or more 64-bit threads.

Integer processing is able to occur by dividing the 32-bit instructions into an upper and lower group, and then mapping each group to a portion of the operand in the 64-bit pathway so that the 64-bits are divided so that the 32-bit instructions are handed independently and in parallel by splitting the 64-bit pathway. In such an approach, the 64-bit pathway no longer processes a 32-bit instruction that is padded, but instead splits the 64-bit pathway and keeps the two split threads isolated from one another. In the context of implementations, it should be noted that the instructions from different threads are already stored into the different fetch queues, and what is referred to here as dividing is a step which involves selecting a fixed number of instructions from one or more threads to issue to the dispatch queues. In various implementations, different policies are used to select this set of instructions for dispatch.

In an implementation, two additional fetch queues are added to hold instructions for the two additional threads. Thus, the pipeline again begins with an instruction cache 210. However, here there are four fetch queues 212A-D that retrieve four instructions that as before are decoded. For the integer paths, the integer instructions diverge into two integer paths, each handled by a set of threads. Likewise, for the floating-point path, the floating-point instructions are divided into two floating-point paths, each handled by a set of threads.

The integer instructions are sent into an integer register file (IRF) 216. However, the IRF is subdivided into upper IRF 218A and lower IRF 218B that are isolated from each other. For example, in one implementation the IRF may be divided from 64 bits into an upper 32 bits and a lower 32 bits to support multi-threading operations for 32-bit integer instructions. The split need not necessarily be simply upper and lower halves; and all that is necessary is that the data into and out of the IRF be mapped such the two pathways are strictly isolated from one another.

While this technology could be applied to the floating-point register file, because floating-point data size (typically single, double, and quad-precision) is determined by application requirements and independent of the 32-bit vs. 64-bit nature of the architecture, and because floating-point units of a given size are not easily divisible into multiple floating point units, the floating-point register file is replicated instead of divided. These additional blocks are shown as floating-point register files 220A-B.

On the integer side, the integer register file 216, integer ALUs 226, store queue 234, and load queue 238, and optionally the ROB 242 are configured so that two threads can respectively share the resources of these elements, as will be described in more detail below. In the example, these blocks may be shared by two 32-bit threads in a 64-bit processor. For example, the integer ALUs 226 are divided into upper ALU 228A and lower ALU 228B, and the store queue 234 is divided into upper store queue 232A and lower store queue 232B, while load queue 238 is divided into upper load queue 236A and lower load queue 236B. However, in another implementation rather than dividing the store queue 234 and load queue 238, the implementation may simply provide for multiple load queues and/or store queues. The ROB may be shared in an implementation in which the ROB would actually contain instruction results. In another implementation where the ROB just contains mappings, the ROB may actually be replicate for each thread. In a checkpoint-based architecture, there may actually be separate checkpoints for each thread.

These blocks are shown in FIG. 2 with a dotted line down the middle that indicates that they can be shared by twice as many 32-bit threads relative to blocks that are not divided. For example, the integer register files 216 are divided into upper and lower IRFs 218A and 218B, but there are two floating-point register files 220A and 220B. The replication of the floating-point register files 220A and 220B is due to the fact that floating-point data size is independent of the 32-bit vs. 64-bit nature of the architecture, as described above.

As noted, the integer register files 216 are divided into upper IRF 218A and lower IRF 218B. In a implementations in which the number of physical registers equals the number of architectural registers, one half of the 32-bit threads use the upper half of the register file, upper IRF 218A, and one half use the lower half of the register file lower IRF 218B. In other implementations in which the number of physical registers is more than the number of architectural registers, e.g., to allow for register renaming for out of order execution, one half of the 32-bit threads allocate from the upper half and one half allocate from the lower half. In these latter implementations, a mapping table between physical and architectural registers is broken into a pair of mapping tables, one for the upper half and one for the lower half. The 64-bit code allocates a register using both upper and lower mappers as both halves of the pathway are necessary for such code. However, the 32-bit code allocates using only its specified mapper (upper or lower.) Examples of how such mapping occurs will be described with reference to FIG. 5 below.

Implementations may include certain variations from the example implementation just discussed in connection with FIG. 2. In one implementation, allocation of 32-bit registers could be dynamically chosen rather than statically. However, the static division approach allows all the registers associated with a particular 32-bit thread to be in one half of the register file and thus does not require steering logic (from upper to lower or vice versa) before and after the ALUs 226 perform their operations.

In another implementation, code that is designed for operands that use the full size of the processor could still take advantage of the separate upper and lower register files to effectively obtain more physical registers for smaller data items. For example, in a 64-bit processor, even if code is 64-bit code, the processor use the techniques provided herein when processing small pieces of data, such as 16-bit or 32-bit variables. This feature can be implemented, for example, by generating separate instructions, such as separate 32-bit instructions, in the ISA, or by dynamically placing data that it can be represented in fewer bits in either an upper or lower register file when processing such data.

With the dynamic scheme steering logic and handling of the result register size are implemented to handle situations in which operands and/or the result are of mixed bit sizes. For example, the ALUs are partitioned into upper and lower halves. When used as a separate pair none of the carries, etc., inherent to arithmetic pass between the upper and lower halves. For architectures with condition codes, both upper and lower condition codes are generated by configuring hardware for the ALU to generate both 64-bit and 32-bit condition codes.

For load and store queues, the upper and lower halves of the data queues are divided. For example, the load and store address queues are replicated if there is one address queue per thread. Similarly, the load and store address queues are extended to allow the marking of the additional threads when there is a single address queue shared by multiple threads.

Optimizations around 64-bit architectures in terms of only using the upper or lower half of the data queues for 32-bit loads/stores are also implemented for the dynamic placement of data. Usage of the data queues for mixtures of 32-bit and 64-bit loads and stores are facilitated by use of a set of upper and lower mappers between load and/or store address queues and a set of data stored in memory. The 32-bit load and store queues each use either the upper or lower mapper, and the 64-bit load and store queues use both the upper and lower mappers. In some implementations, the address queues may be divided. In particular, store address queues often have to compare their addresses against load for dependencies. With a divided store address queue, implementations may also divide the content-addressable memory (CAM) used for these address comparisons. In some implementations, loads may be issued out of order as well and also need comparators for load addresses.

A re-order buffer (ROB) is used to store information about instructions so that they may be performed out of order, but committed in-order. A variety of appropriate implementations can be used for re-order buffers (ROBs). For ROBs that only contain mappings, the ROBs may use a upper and lower mapping where 64-bit instructions use both mappings and 32-bit instructions only use one of the upper or lower mappings. For ROBs that contain data as well, the ROBs have the same considerations as the IRF for the data. That is, ROBs must be able to ensure appropriate mapping occurs so that ordering concerns are obeyed even though instructions are sharing a processing pathway. Examples of how ROBs may be used in an implementation will be presented in FIG. 5.

Figure 3:
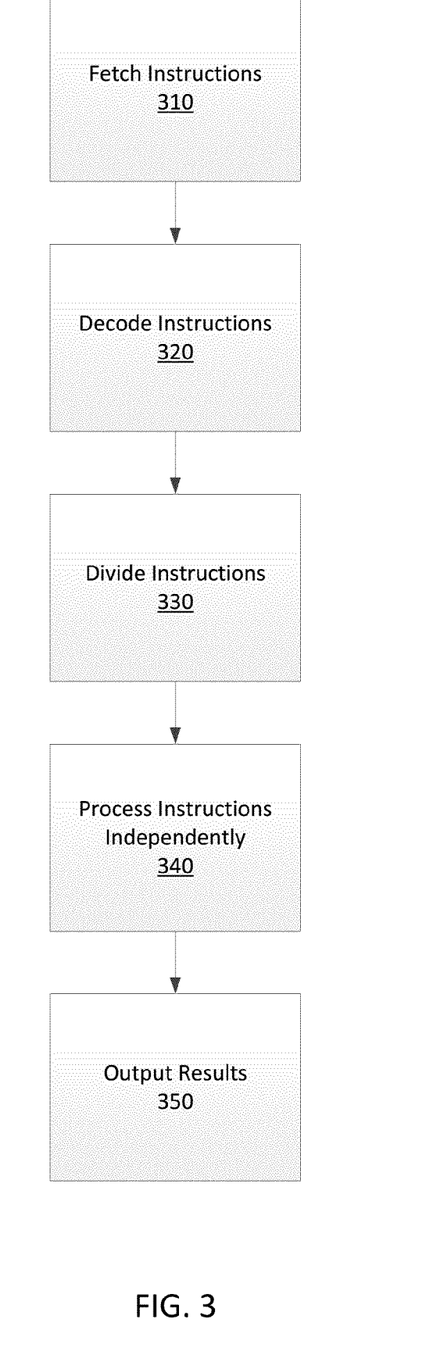
FIG. 3 is a flowchart of steps performed by a processor to double thread resources.

FIG. 3 is a flowchart of steps performed by a processor to double thread resources. The double of a resource can be done, for example, in an integer path, and optionally in a floating-point path.

Block 310 includes fetching instructions. More specifically, block 310 includes fetching a first multiple of instructions using multiple fetch queues (e.g., 2N). Each instruction handles a first number of bits (e.g., b). The instructions are fetched from an instruction cache in a processor designed to handle a second multiple of threads (e.g., N) of a second number of bits in size (e.g., 2b). The first multiple 2N is greater than the second multiple N, and the second number of bits 2b is greater than the first number of bits b. For example, b may be 32, and N may be 2. Block 310 is illustrated in FIG. 2, in which fetch queues 212A-D fetch instructions from instruction cache 210. The purpose of fetching instructions is to obtain instructions so that the processor has access to the instructions so that it can actually execute the instructions.

Block 320 includes decoding instructions. More specifically block 320 includes decoding the first multiple of instructions received from the fetch queues. Decoding instructions may proceed using a decoder 214 that receives codes for the instructions from fetch queues 212A-D and decodes the instructions so that the processor is actually able to execute the instructions.

Block 330 includes dividing instructions. More specifically block 330 includes dividing the first multiple of instructions received from the fetch queues into a second multiple of groups of instructions by issuing instructions to dispatch queues, each of the groups of instructions being instructions handling the first number of bits. For example, where the first multiple is four and the second multiple is two, block 330 divides the first multiple of instructions received from the fetch queues into a first group of instructions handling the first number of bits and a second group of instructions handling first number of bits. The division may be performed by decoder 214, or there may be another module that is dedicated to dividing the instructions. The instructions are separated into groups so as to obtain series of instructions for a thread for the respective group, such that instructions in the first group correspond to one thread, and instructions in the second group correspond to another thread. These threads are designed to be executed independently and in isolation from one another.

Block 340 includes processing the instructions independently. More specifically, block 340 includes processing each group of instructions through a respective integer processing pathway provided by the processor that processes operands of the second number of bits in size. For example, in the case of the second multiple being equal to 2, block 340 includes processing the first group of instructions and the second group of instructions through an integer processing pathway provided by the processor that processes operands of the second number of bits in size. The first set of bits in the operand are used to process instructions from the first group in a first pathway and a second set of bits in the operand are used to process instructions from the second group in a second pathway. The first and second group of instructions are mapped to first pathway and second pathway such that the first and second pathway operate simultaneously and process information independently in two separate thread.

As described above, processing the instructions independently may include splitting or duplicating resources used to process the instructions. For example, integer register file 216 may be split into upper IRF 218A and lower IRF 218B, ALUs 226 may be split into upper ALU 228A and lower ALU 228B, store queue 234 may be split into upper store queue 232A and lower store queue 232B, load queue 238 may be split into upper load queue 236A and lower store queue 236B. Other parts of the processing pipeline, such as integer dispatch queue, data cache 240, and re-order buffer 242 may be reconfigured so that they are able manage multiple instructions through a single integer processing pathway.

As described with respect FIG. 2 above, floating-point instructions may be routed in a similar manner through a respective floating-point pathway, which may be split into multiple threads as well.

Block 350 includes outputting results of the processing of each of the groups. More specifically block 350 includes outputting the results of the processing of the first and second groups of instructions. It may be noted that re-order buffer may operate before finalizing results, to ensure that operations are managed and committed in an appropriate manner.

Figure 4:
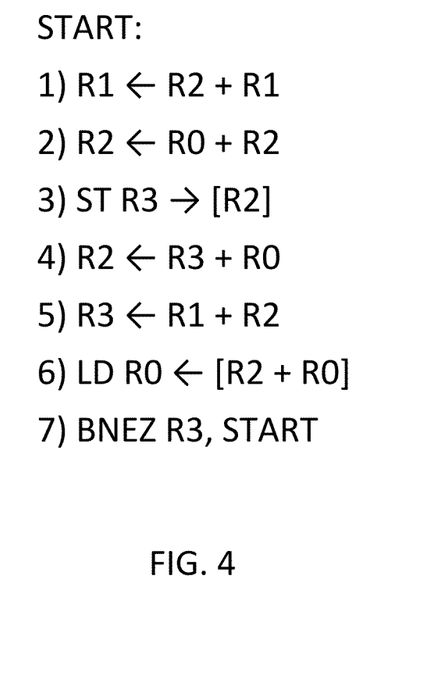
FIG. 4 is sample assembly language code for a series of steps and that is processed according to FIG. 5.
Figure 5:
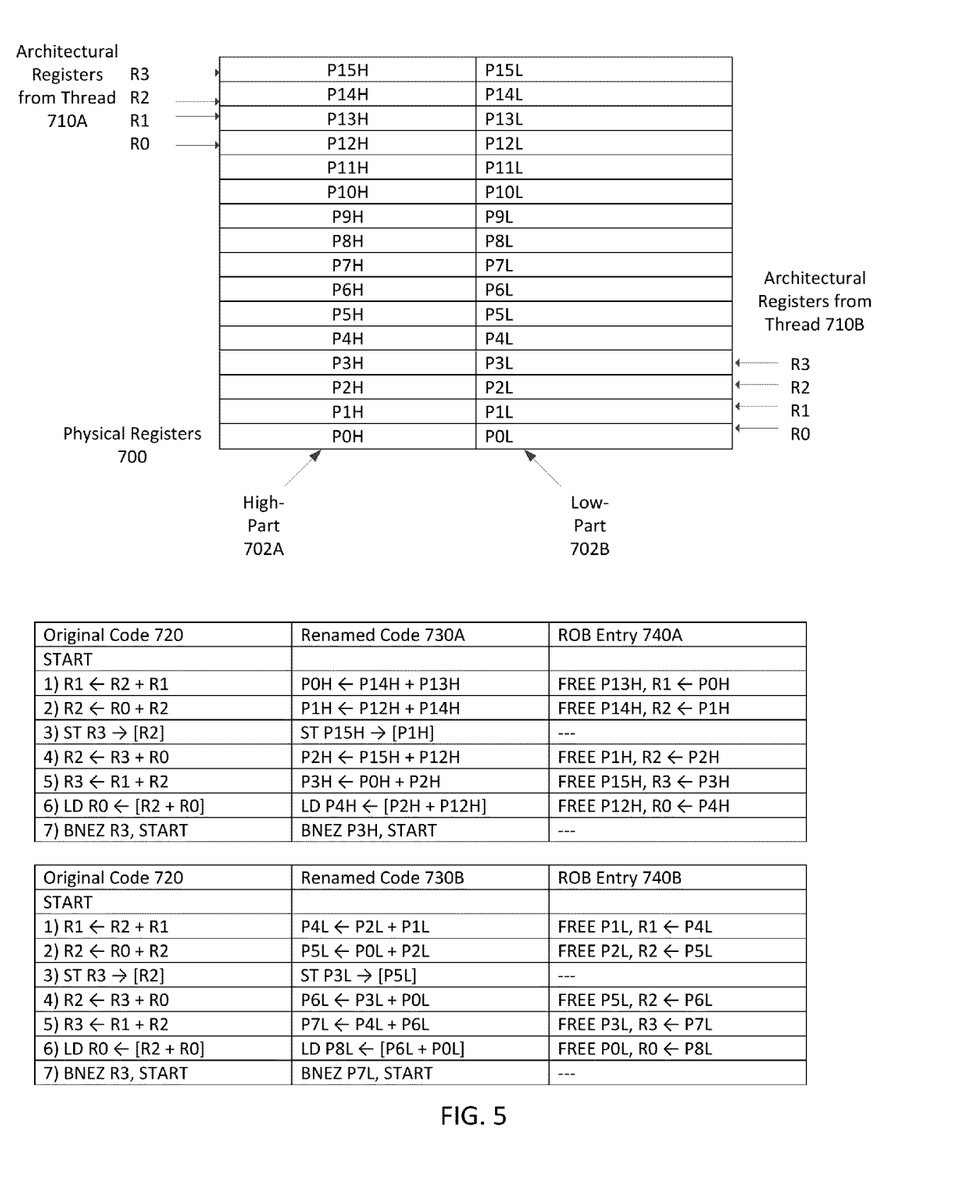
FIG. 5 is sample assembly language code for the series of steps performed by two threads, in an implementation, accompanied by information about register mappings.

FIG. 4 is sample assembly language code for a series of steps and that is processed according to FIG. 5. The code is not meant to accomplish any particular processing task, and is meant as generic instructions, rather than corresponding to any particular assembly language syntax. However, the steps show a variety of operations, including sum instructions, a store instruction, a load instruction, and a branch instruction. As the instructions operate on information in architectural registers, it is necessary to map the architectural registers to physical registers to store results temporarily as the code may not immediately be able to commit its results. This assembly code will be considered in FIG. 5 to illustrate different mappings that may occur between physical and architectural registers as the processing steps are performed.

Note that if there were only one thread processing the instructions, then register mapping is relatively straightforward. In particular, physical registers are accessed by a mapping from architectural registers from the single thread. Corresponding ROB entries that include information about what is necessary to be committed in order for a physical register to be freed and available for subsequent use is likewise straightforward, as the physical registers, in the absence of thread competition, are allocated and freed as appropriate.

Conversely, in a conventional multi-thread approach, two threads are sharing the same pool of registers, and each thread performs the operations prescribed the code in parallel. Thus, each thread has access to its own set of code, and each set of code has access to its own set of ROB entries. However, due to there being two threads executing at the same time, the physical registers will be allocated to serve as the architectural registers for each thread. If, however, results are not committed soon enough, may not be enough physical registers to completely satisfy the requirements both threads.

However, when the operands are smaller than the width of the processor, as in the implementations described in this specification, the approach of FIG. 5 can be used.

FIG. 5 is sample assembly language code for the series of steps performed by two threads accompanied by information about register mappings. There is a set of 16 example physical registers 700, P0-P15. For example, the physical registers 700 may be 64-bit registers. These physical registers may be accessed by a mapping from architectural registers from each of the multiple operating threads. Original code 720 corresponds to the code from FIG. 4. However, renamed code 730 illustrates that as original code 720 is executed, physical registers 700 are substituted for architectural registers from the threads 710 and 710B so that information is stored in physical registers 700 until the program is ready to commit. Additionally, FIG. 5 shows a set of ROB entries 740. The ROB entries 740 include information about what is necessary to be committed in order for a physical register to be freed and available for subsequent use.

In particular, each physical register is divided into a high-part 702A and a low-part 702B. Registers from thread A 710A and registers from thread B 710B are assigned and used to carry out original code 720. However, the high-part 702A and the low-part 702B of each physical register 700 is strictly isolated from each other. Hence, in the implementation illustrated in FIG. 5, thread A has its own set of 16 32-bit registers, and thread B has its own set of 16 32-bit registers. Thus, thread A produces renamed code 730A that is accompanied by ROB entry 740A, and thread B produces renamed code 730B that is accompanied by ROB entry 740B. However, thread A operates exclusively on the top portion of the physical registers 700, and thread B operates exclusively on the bottom portion of the physical registers 700. Thus, this approach takes advantage of the processing resources provided by an architecture in which two 32-bit threads are mapped on a 64-bit processor, or, more generally, n k-bit threads mapped onto an n*k bit processor.

Thus, this approach to processor architecture and operation offers an approach, not previously used, to improve performance and resource utilization in situations where it is appropriate.

The term "processor" encompasses all kinds of apparatus, devices, and machines for processing data, including by way of example a programmable processor, a computer, a system on a chip, or multiple ones, or combinations, of the foregoing. The processor can also include, in addition to hardware, code that creates an execution environment, e.g., code that constitutes processor firmware, a protocol stack, etc.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for managing thread execution in a process, the method comprising:
   fetching a first multiple of instructions using multiple fetch queues equal to the first multiple, each instruction a first bit size, from an instruction cache in a processor designed to handle a second multiple of threads of a second bit size, where the first multiple is greater than the second multiple and the second bit size is greater than the first bit size;
   decoding the first multiple of instructions received from the fetch queues;
   dividing the first multiple of instructions received from the fetch queues into a first group of a second multiple of instructions of the first bit size and a second group of a second multiple of instructions of the first bit size; and
   processing the instructions in the first group in an upper integer processing pathway and processing the instructions in the second group in a lower integer processing pathway, wherein the upper integer pathway uses an upper X bits of a 2X bit integer pathway of the processor to process the first group of the second multiple of instructions, and the lower integer pathway uses a lower integer X bits of the 2X bits of the integer pathway of the processor to process the second group of the second multiple of instructions, wherein the upper and lower pathways are mapped such that the upper and lower pathways operate simultaneously and process information independently.

2. The method of claim 1, wherein the first multiple of instructions is fetched from an instruction cache.

3. The method of claim 1, further comprising using a reorder buffer or checkpointing unit to manage the processing of the threads to ensure that the results of the processing are committed in program order.

4. The method of claim 1, wherein processing the first group of instructions and the second group of instructions uses at least one of shared store queues or shared load queues.

5. The method of claim 4, wherein shared store queues and load queues use divided or replicated or extended data queues and divided or replicated or extended address queues.

6. The method of claim 1, wherein the first bit size is a power of 2 that is at least 8, and the second bit size is twice the first bit size.

7. The method of claim 1, wherein the processing uses a divided integer register file.

8. The method of claim 7, wherein the integer register file uses static mapping.

9. The method of claim 7, wherein the integer register file uses dynamic mapping.

10. A system for managing thread execution in a processor, the system comprising:
    a processor, configured to perform the operations of:
    fetching a first multiple of instructions using multiple fetch queues equal to the first multiple, each instruction a first bit size, from an instruction cache in a processor designed to handle a second multiple of threads of a second bit size, where the first multiple is greater than the second multiple and the second bit size is greater than the first bit size;

decoding the first multiple of instructions received from the fetch queues;

dividing the first multiple of instructions received from the fetch queues into a first group of a second multiple of instructions of the first bit size and a second group of a second multiple of instructions of the first bit size; and processing the instructions in the first group in an upper integer processing pathway and processing the instructions in the second group in a lower integer processing pathway, wherein the upper integer pathway uses an upper X bits of a 2X bit integer pathway of the processor to process the first group of the second multiple of instructions, and the lower integer pathway uses a lower integer X bits of the 2X bits of the integer pathway of the processor to process the second group of the second multiple of instructions, wherein the upper and lower pathways are mapped such that the upper and lower pathways operate simultaneously and process information independently.

11. The system of claim 10, wherein the first multiple of instructions is fetched from an instruction cache.

12. The system of claim 10, further comprising using a reorder buffer or checkpointing unit to manage the processing of the threads to ensure that the results of the processing are committed in program order.

13. The system of claim 10, wherein processing the first group of instructions and the second group of instructions uses at least one of shared store queues or shared load queues.

14. The system of claim 13, wherein shared store queues and load queues use divided or replicated or extended data queues and divided or replicated or extended address queues.

15. The system of claim 10, wherein the first bit size is a power of 2 that is at least 8, and the second bit size is twice the first bit size.

16. The system of claim 10, wherein the processing uses a divided integer register file.

17. The system of claim 16, wherein the integer register file uses static mapping.

18. The system of claim 16, wherein the integer register file uses dynamic mapping.

* * * * *